United States Patent [19]

Moelbert

[11] 3,908,496
[45] Sept. 30, 1975

[54] HYDRAULIC SHEARING MACHINE
[75] Inventor: Heinrich Moelbert, Hamburg, N.Y.
[73] Assignee: Advanced Machine Design Company, Cleveland, Ohio
[22] Filed: Feb. 28, 1974
[21] Appl. No.: 446,781

Related U.S. Application Data
[63] Continuation of Ser. No. 324,872, Jan. 18, 1973, abandoned.

[52] U.S. Cl. .................. 83/157; 83/378; 83/390; 83/391; 83/617; 83/639
[51] Int. Cl.² .......................................... B26D 7/04
[58] Field of Search ............ 83/378, 390, 380, 388, 83/389, 157, 617, 129, 391, 639; 269/234

[56] References Cited
UNITED STATES PATENTS

| | | | |
|---|---|---|---|
| 402,457 | 4/1889 | Kennedy | 83/378 |
| 724,010 | 3/1903 | Huber | 83/639 X |
| 891,626 | 6/1908 | Loss | 83/639 X |
| 2,203,884 | 6/1940 | Stone | 83/129 |
| 2,699,649 | 1/1955 | Messick | 83/380 X |
| 3,001,422 | 9/1961 | Klancvik | 269/234 X |
| 3,039,344 | 6/1962 | Hercik | 83/390 X |
| 3,066,566 | 12/1962 | Bottenhorn | 83/639 X |
| 3,623,389 | 11/1971 | Krynytzky et al. | 83/617 |

FOREIGN PATENTS OR APPLICATIONS

| | | |
|---|---|---|
| 153,053 | 7/1904 | Germany |
| 254,376 | 12/1912 | Germany |
| 281,794 | 2/1915 | Germany |
| 328,475 | 10/1920 | Germany |
| 940,195 | 3/1956 | Germany |
| 1,402,356 | 1/1970 | Germany |

OTHER PUBLICATIONS
Tool Engineers Handbook by ASTE Handbook Committee, published 1949 by McGraw Hill Book Co. Inc., pp. 1605, 1606, 1614–1616.

*Primary Examiner*—Frank T. Yost
*Attorney, Agent, or Firm*—Donnelly, Maky, Renner & Otto

[57] ABSTRACT

A hydraulic shearing machine of the type wherein opposite sides of longitudinally adjacent sections of a length of bar stock and the like are engaged respectively between a fixed knife and a hold down member and between a movable knife and a yieldable back support member characterized in that the movable knife, the hold down member, and the back support member are hydraulically actuated from the same fluid pressure source to shear the bar between said sections while the latter are maintained in parallel relation by the hold down and back support forces which are proportionately related to the variable shearing forces encountered during the shearing of the bar and the variable shear forces encountered in the shearing of bars of different sizes and materials, the magnitude of the fluid pressure from said source being variable automatically in accordance with the shearing resistance imposed by the particular bar being sheared. The machine herein is further characterized in that a back gage member is also hydraulically actuated by the low pressure-high volume or the high pressure-low volume pump of a dual pump system, said system providing for rapid traverse of the hold down and knife actuators toward and away from the bar and for high pressure actuation by the high pressure-low volume pump of the system upon engagement of the hold down member and movable knife with longitudinally adjacent sections of the bar.

12 Claims, 2 Drawing Figures

HYDRAULIC SHEARING MACHINE

This is a continuation of application Ser. No. 324,872 filed Jan. 18, 1973, now abandoned, the U.S. Pat. No. 3,795,165, dated Mar. 5, 1974 on said application having been withdrawn from issue.

BACKGROUND OF THE INVENTION

In one known form of shearing machine such as disclosed in my U.S. Pat. No. 3,152,499 the movable knife is actuated by the usual eccentric mechanism and the hold down and back support members are hydraulically actuated through a booster with massive forces against the respective fixed and movable shear knives regardless of the magnitude of the force required to shear the stock.

Said U.S. Pat. No. 3,152,499 also has a limit switch which, upon predetermined lateral displacement of adjacent sections of the stock, decreases the massive forces on the hold down and back support members to prevent high pressure rubbing or scoring contact of the mating convex and concave sheared surfaces by relaxing the hold down and back support forces so that the stock and the slug sheared therefrom may move longitudinally with respect to each other. However, this problem of high pressure rubbing contact of the sheared surfaces is solved in the patent only when the point of shearing is the same for each slug because the reduction in such massive forces is triggered by the actuation of said limit switch. As known to those skilled in the art, the shear points of the slugs cut from 4 inch square steel bar stock, for example, may vary from say ¼ inch on hard steel to ¾ inch on soft steel and from, say, ¼ inch to ½ inch knife penetration of the same grade of steel supplied from different rolling mills or from different heats, and hence, the aforesaid limit switch must be set at a point which is at least equal to the maximum shear point whereby, when the slugs shear at points less than the maximum, the massive forces are not decreased immediately upon shearing whereby high pressure rubbing contact will occur with resulting scoring of the sheared surfaces. Moreover, said limit switch must be reset each time that there is a change in the bar size or material.

Moreover, in said U.S. Pat. No. 3,152,499, the bar which lifts a certain distance from the feed table while the cut is being made will be driven down on the feed table by the massive hold down force as soon as the cut is completed. This has caused damage to the feed-in conveyor and has made it necessary to use a costly heavy duty type of feed table.

SUMMARY OF THE INVENTION

It is a principal object of the present invention to provide a hydraulic shearing machine in which the movable knife and the hold down and back support members are hydraulically actuated by fluid pressure of magnitude dependent upon the shearing force required to shear the stock, the back support member and hold down member cylinders being comparatively small in relation to the knife actuating cylinder.

It is another object of this invention to provide a hydraulic shearing machine in which the hold down resistance against bar kick-up is derived from a relatively small hydraulic cylinder multiplied by a self-releasing wedge and the frictional resistance at the wedge guides to obtain a hold down force which is proportionate to the shearing force required, as the shearing of the stock progresses with decreasing shearing force.

It is yet another object of this invention to provide a hydraulic shearing machine which embodies a dual hydraulic pump system in which both a low pressure-high volume pump and a high pressure-low volume pump conjointly supply fluid to the knife actuating cylinder and to the hold down and back support actuating cylinders to achieve rapid traverse of the movable knife toward and away from the stock and rapid completion of the movable knife stroke upon shearing of the stock. In such dual pump system the low pressure-high volume pump is automatically unloaded whereupon the required shearing and hold down and back support pressure is supplied solely from the high pressure-low volume pump to provide the required shearing force and hold down force together with yieldable back support force.

It is yet another object of this invention to provide a hydraulic shearing machine which includes a hydraulically actuated back gage which is adapted to be engaged by the end of the stock to position the stock for shearing of slugs of predetermined length from the end of the stock, said back gage cylinder being automatically retracted from its gaging position to enable longitudinal movement of the slug as caused by continued lateral displacement of the slug after shearing. The back gage may also be retracted to permit discharge of the slug from the back support member as the stock is advanced for shearing of the nest slug therefrom.

It is yet another object of this invention to provide a hydraulic shearing machine which has a back support mechanism guided in the tool holder arrangement to prevent tipping of the back support beam in the vertical direction. The rigid guiding makes it possible to support the piece being sheared firmly in the horizontal plane for a relatively long distance from the cutting edge of the knives. Therefore, the advantage of a long moment arm is used to hold the cut-off piece straight which also reduces the force required by the back support cylinders.

It is yet another object of this invention to provide a hydraulic shearing machine which has an automatic hold down mechanism which is readily adjustable in heights to compensate for large bar size variations. This makes the hold down cylinder stroke short and the contact bar fast acting.

Other objects and advantages will appear from the ensuing description.

DETAILED DESCRIPTION OF A PREFERRED EMBODIMENT

Figure 1:
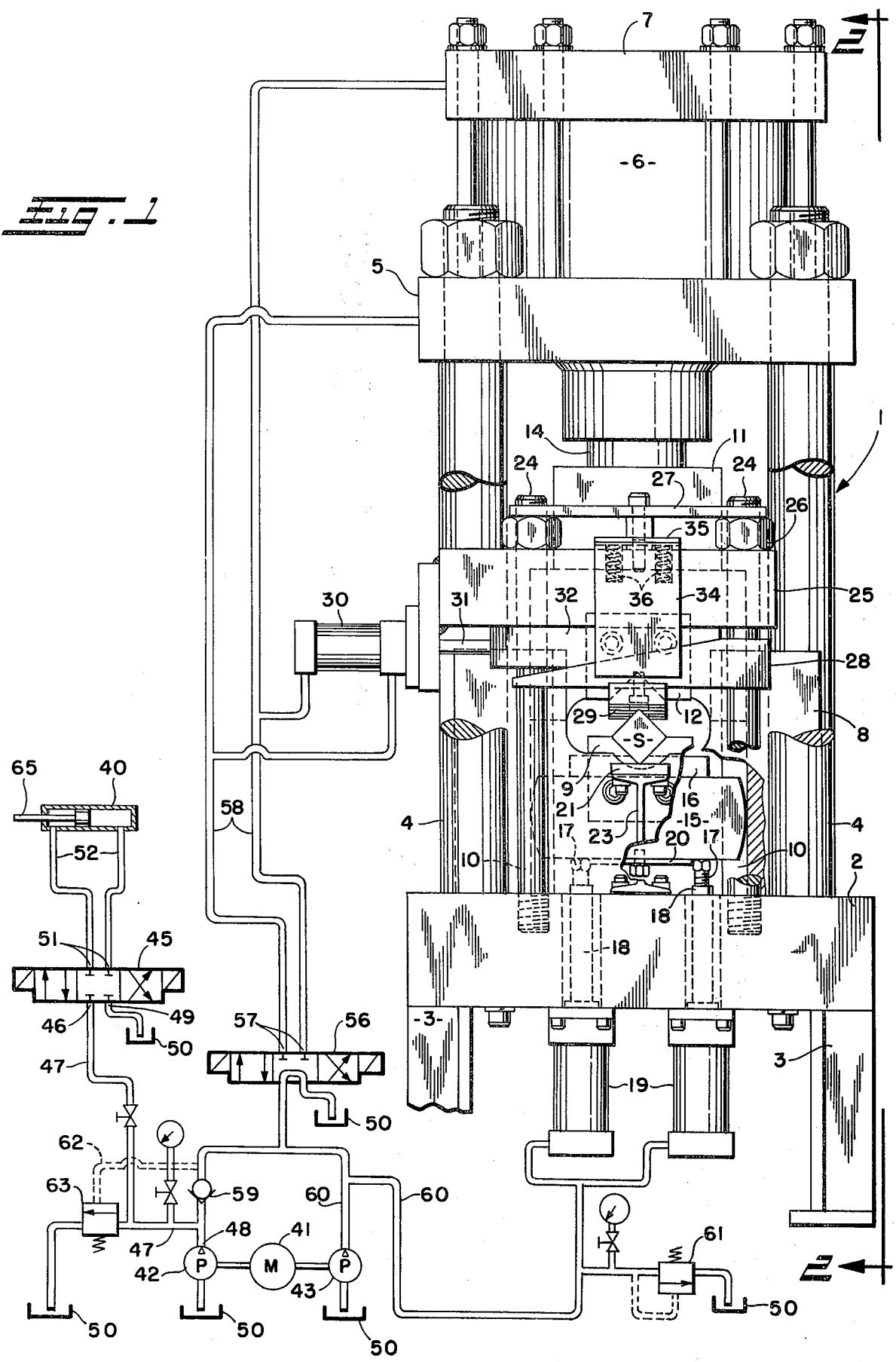
FIG. 1 is a front end elevation view of a preferred form of hydraulic shearing machine as viewed from the stock feed end thereof, said FIG. 1 schematically illustrating the hydraulic system for controlling the operation of the knife, hold down, back support, and back gage cylinders.
Figure 2:
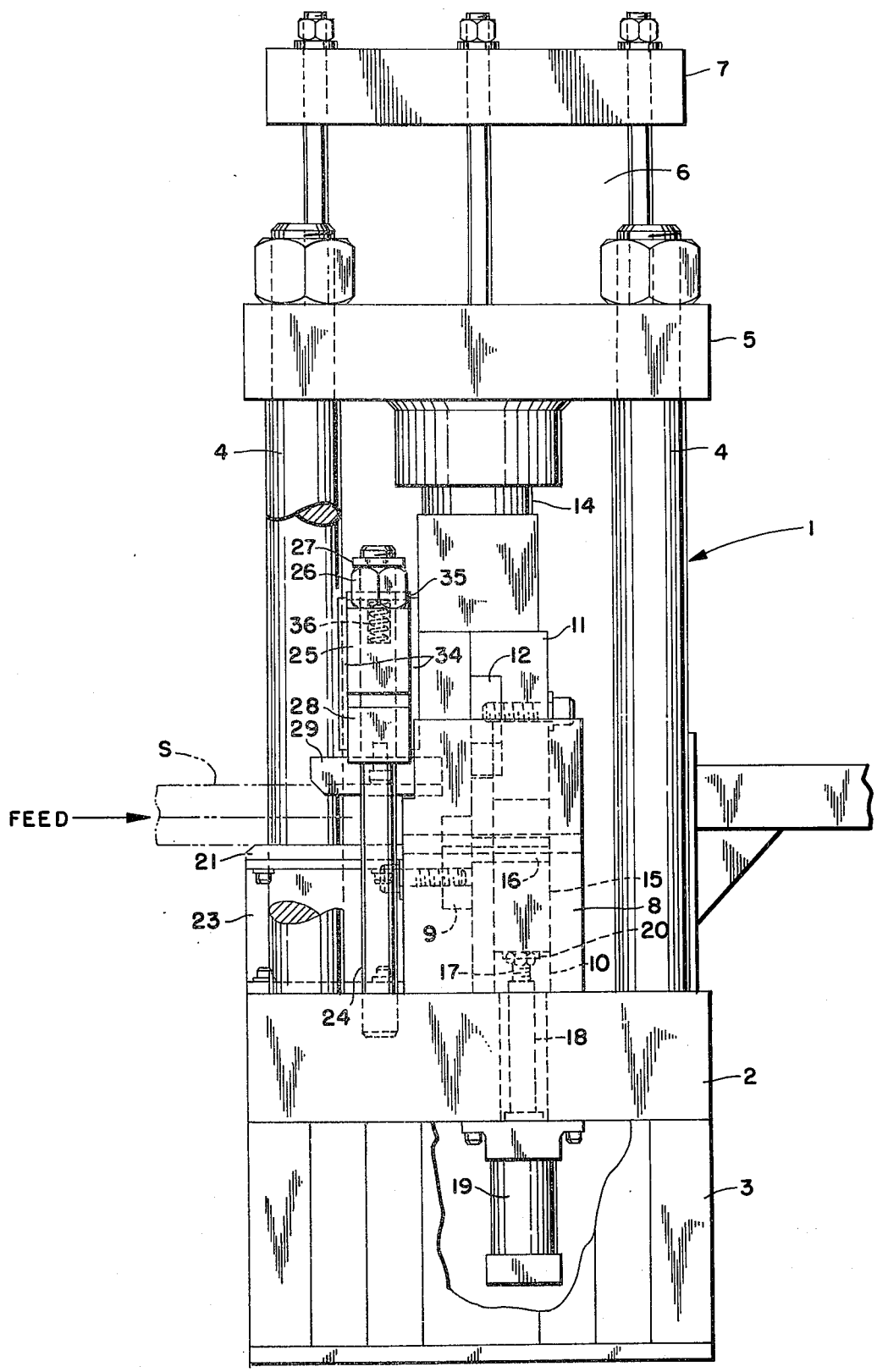
FIG. 2 is a side elevation view as viewed along the line 2—2, FIG. 1.

The hydraulic shearing machine 1 herein comprises a base plate or lower head 2 supported as on column 3 and having secured thereto the lower ends of tie bars 4 which have their upper ends secured to an upper head 5 which preferably constitutes the cylinder head of the knife actuating cylinder 6. The upper head 7 of the knife actuating cylinder 6 is secured to the head 5 as by means of studs as shown.

Secured on the base plate 2 is a block-like guide member 8 to which the fixed knife 9 is bolted as shown and which has vertical guides 10 for the carrier 11 for the movable knife 12, the latter being bolted to the carrier 11 as shown. The knife carrier 11 is secured to the piston rod 14 of the knife actuating cylinder 6. When square stock S is to be sheared the fixed knife 9 and the movable knife 12 will be provided with V-shaped cradles as shown.

The back support member comprises a bar 15 in guides 10 having a contact plate 16 which is engaged by the stock S, said bar 15 being supported for downward yielding movement by the studs 17 in the upper ends of the piston rods 18 of back support actuating cylinders 19 secured beneath the base plate 2. Adjustment of the bar and plate is effected by turning the studs 17 and adjustment is maintained as by means of the retainer 20 on bar 15 having its ends engaged with flats of the heads on the studs 17 to prevent turning of the latter.

Coming now to the hold down assembly, the same comprises a stock support plate 21 mounted on the upper flange of an I-beam 23 which is secured on the bed plate 2. The bed plate 2 has screwed thereinto a pair of tie rods 24 to which the upper head 25 of the hold down assembly is adjustably secured by nuts 26 and cross bar 27. Vertically reciprocable on said tie rods 24 and upper head 25 is a hold down carrier 28 which has secured therebeneath the hold down member 29 which has a V-shape notch to engage the upper side of the stock S during the shearing operation. The hold down actuating cylinder 30 is secured to the head 25 as shown and has its piston rod 31 secured to a wedge member 32 and when the cylinder 30 is actuated to move the wedge member 32 to the right the hold down carrier 28 is actuated downwardly to effect engagement of the hold down member 29 with the upper side of the stock S to hold it against the stock supporting plate 21 and the fixed knife 9. The taper of the wedge surfaces of wedge 32 and carrier 28 is preferably about 10° ± 2°which in the case of steel parts results in a small horizontal kick-back force since the frictional resistance coming from the upper and lower wedge guide helps the hold down cylinder 30 (2 inch dia., for example) to hold the wedge 32, the contact plate 29, and the hold down carrier 28 in place to resist bar kick-up. Thus, the hold down is resisting bar kick-up and not applying a massive clamping force as described in U.S. Pat. No. 3,152,499.

The back support bar 15 is supported by one or multiple hydraulic cylinders which resist the downward bending of the sheared slug during the cut with approximately 6% of the force required for the cutting of the material being sheared. The resistance of the back support is always and automatically in the same ratio with the shear force required by the main cylinder 6. This is not the case on the work support described in U.S. Pat. No. 3,152,499. There the massive work support force is always the same even if the shear force changes. Also, the back support bar 15 is rigidly guided in the tool holder assembly to prevent tipping of the contact plate 16 in the horizontal direction. Thus, it is not necessary to impose massive gripping forces between the hold down member 28–29 and the fixed knife 9 and support 21–23 and between the knife 12 and the back support member 15–16.

The hold down carrier 28, in addition to being guided by the tie rods 24 is additionally guided by the side plates 34 welded there to which extend upwardly which have a bridge portion 35 against which the springs 36 bear to raise the hold down member 28–29 when the wedge 32 is moved to the left from the FIG. 1 position. The hold down actuator wedge 32 is provided with a slot which embraces the left tie rod 24 in FIG. 1 and which permits movement of the actuator wedge 32 to cause movement of the hold down carrier 28 and hold down member 29 downwardly to stock holding position and to permit withdrawal of the actuator wedge 32 for spring 36 retraction of the hold down carrier 28 and hold down member 29 upwardly out of engagement with the stock S.

The hydraulic system herein for controlling the actuation of the movable knife actuating cylinder 6, the hold down actuating cylinder 30, the back support actuating cylinders 19, and the back gage cylinder 40 comprises a drive motor 41 having coupled thereto a dual pump including a high volume-low pressure pump 42 e.g. 51 g.p.m. at 300 psi at 1800 r.p.m. and a low volume-high pressure pump 43 e.g. 8 g.p.m. at 3500 psi at 1800 r.p.m.

The operation of the back gage cylinder 40 is controlled as by a four way solenoid operated valve 45 which has its inlet port 46 connected by way of conduit 47 to the outlet port 48 of the low pressure-high volume pump 42, its return port 49 communicated with the reservoir 50, and its motor ports 51 connected by conduits 52 to the opposite ends of the back gage actuating cylinder 40. As well known in the art, when the left solenoid is energized, fluid under pressure is conducted to the rod end of the back gage actuating cylinder 40 and the fluid displaced from the head end of the cylinder 40 is returned to the reservoir 50 and, when the right solenoid is energized, fluid under pressure is conducted into the head end of the back gage actuating cylinder 40 and the fluid displaced from the rod end is conducted to the reservoir 50.

The actuation of the knife and hold down actuating cylinders 6 and 30 is controlled by a four way solenoid operated valve 56 which has its motor ports 57 connected by the conduits 58 to the respective head and rod ends of said knife and hold down actuating cylinders 6 and 30 and when said valve is in neutral position as shown in FIG. 1 the output of both pumps 42 and 43 is bypassed to the reservoir 50, there being a check valve 59 in the low pressure-high volume pump 42 output line. The high pressure-low volume pump 43 output line is connected by the conduit 60 to the head ends of the back support actuating cylinders 19 and when the solenoid valve 56 is in neutral position as shown the back pressure in the system is sufficient to hold the pistons of cylinders 19 at the upper ends of their strokes whereby the back support member 15–16 is held in position to support the stock S adjacent the fixed knife 9. The high pressure-low volume pump 43 output line 60 has therein a relief valve 61 which opens to relieve excess pressure to the reservoir 50. The output line 60 downstream of the check valve 59 has a pilot line 62 which is connected to an unloading valve 63 so that when the pressure downstream of the check valve 59 reaches a predetermined value the low pressure-high volume pump 42 is unloaded through the unloading valve 63 to the reservoir 50.

When the left solenoid of valve 56 is energized the output of both pumps 42 and 43 is conducted to the rod ends of the knife and hold down actuating cylinders 6 and 30 thus to raise the knife 12 and hold down member 29 to their upper positions and, of course, the pressure in the output line 60 returns the back support actuating cylinders 19 to their upper end positions to position the back support member 15–16 to register with the fixed knife 9. It is to be understood that the machine 1 will be provided with suitable switches (not shown) to deenergize the left solenoid when the cylinders 6, 7, 9 and 30 have been actuated as aforesaid and at this time the stock S may be advanced until its end contacts the back gage 65 which predeterminately positions the end of the stock S with respect to the fixed knife 9. To effect shearing of the stock S, the right solenoid of the valve 56 is energized to communicate the pressure output line from the pumps 42 and 43 with the conduit 58 leading to the head ends of the knife and hold down actuating cylinders 6 and 30 while the conduit 58 connected to the rod ends of said cylinders is communicated with the reservoir 50. Initially, as the hold down member 28–29 and movable knife 12 move downwardly, such movement occurs at a rapid rate at low pressure by the conjoint discharge of both pumps 42 and 43. When the movable knife 12 and hold down member 28–29 come into contact with the stock S, the pressure in the output line 60 increases and when a specified increased pressure is reached, the unloading valve 63 is opened to unload the low pressure-high volume pump 42, and thereafter the knife 12, hold dwon 28–29 and back support 15–16 cylinders 6, 30, and 19 are actuated by increasing pressure as the shearing operation progresses.

The magnitude of the fluid pressure in the knife, hold down and back support cylinders 6, 30 and 19 is substantially equal and is of magnitude dependent upon the force required to shear the stock S. When the shearing force decreases, the fluid pressure in the cylinders 6, 30 and 19 likewise decreases and hence the hold down and back support forces correspondingly decrease.

It is known in the shearing of bar stock and the like that the shearing will occur along mating convex and concave surfaces, and hence, by reason of the correlation of the shearing, hold down, and back support forces as aforesaid there will be no high pressure rubbing or scoring of the shear surfaces because of the lack of high pressures whereby the slug of stock may slip longitudinally as it is being displaced vertically by the knife 12 and back support member 15–16.

As evident from the foregoing, the hold down member 28–29 and the back support member 15–16 operate on the same fluid pressure as the knife 12 actuator 6 whereby there is achieved an automatic force compensation in the hold down and back support members when the shear forces vary because of change in material or stock size. Moreover, in the present hydraulic shearing machine 1 no switch means is required to relieve the hold down and back support forces because the hold down force and back support force is released as soon as the shearing operation is completed, this being important since massive force holding of the stock S and of the sheared piece or slug of stock S after the cut has been made will rub the sheared surfaces against each other and scratch or score the faces of the same. As known, these scratches or score marks can show up in the forging or other product which is made from the sheared pieces of stock. Also, when the hold down is released in known machines after the cut is completed, the bar which was raised off the feed conveyor during the cut will be forced back on to the feeding device by the massive hold down force which may result in severe damage to the conveyor system.

As previously mentioned, shearing of stock S is effected by a relatively short distance of movement of the knife 12 in comparison with the stock S size. For example, a three inch square bar may only require a half inch stroke, but this point of shearing is not exactly the same for all bars of the same material and in fact there may be variation of the shearing points of a single bar. Accordingly, the machine herein will be provided with a suitable limit switch (not shown) which will stop the downward stroke of the movable knife 12 at a point well past the shearing points of stocks of different sizes and materials so that it is not ever necessary to adjust said limit switch. However, such limit switch may be adjusted to decrease the free travel of the knife 12 with smaller bar sizes. Such limit switch may deenergize the right solenoid of the valve 56 for return of the valve to neutral position and for automatic operation of the machine, the left solenoid of the valve 56 may be energized to institute rapid return strokes of the cylinders 6 and 30 by the conjoint discharge of both pumps.

Now, when the stock S is advanced the cut piece or slug will be moved from the back support 15–16 so as to be discharged therefrom and appropriate means may be provided to energize the right solenoid of the four way valve 45 thus to actuate the back gage cylinder 40 to its gaging position for engagement by the end of the stock S preparatory to performing the next shearing operation.

It will be apparent to persons skilled in the art that a suitable electrical control circuit may be embodied in the machine 1 including for example a pump start switch, a switch for inching the machine, a switch to select manual or automatic operation of the machine, a switch to manually control raising or lowering of the knife 12, an emergency stop switch, a gage control switch for automatic operation of the gage control valve 45 with manual positions for retraction and extension of the gage cylinder 40. It is also preferred to include appropriate relays and a timer.

The embodiments of the invention in which an exclusive property or privilege is claimed are defined as follows:

1. A hydraulic shearing machine comprising a fixed knife and a movable knife operative to engage opposite sides of longitudinally adjacent sections of a bar or the like to be sheared; a yieldable back support member opposite said movable knife operative to move with the latter during the shearing operation; a hold down member opposite said fixed knife operative to hold the bar in fixed position against said fixed knife during shearing movement of said movable knife; parallel connected fluid motors operative to move said movable knife and said hold down member toward and away from the bar; pump means and directional control valve means operatively connected to said fluid motors to actuate them by substantially equal fluid pressures to apply hold down force proportional to the shearing force as applied by said knife actuating motor; and a fluid motor operatively connected to said back support member and having fluid communication with the fluid pressure line between said pump means and said directional control valve means whereby the back support force is also proportional to the shearing and hold down forces.

2. A hydraulic shearing machine comprising a fixed knife and a movable knife operative to engage opposite sides of longitudinally adjacent sections of a bar or the like to be sheared; a yieldable back support member opposite said movable knife operative to move with the latter during the shearing operation; a hold down member opposite said fixed knife operative to hold the bar in fixed position against said fixed knife during shearing movement of said movable knife; parallel connected fluid motors operative to move said movable knife and said hold down member toward and away from the bar; pump means and directional control valve means operatively connected to said fluid motors to actuate them by substantially equal fluid pressures to apply hold down force proportional to the shearing force as applied by said knife actuating motor; said pump means comprising a dual pump system including a low pressure-high volume pump, and a high pressure-low volume pump operatively connected to supply fluid under pressure to said directional control valve means, an unloading valve means to unload said low pressure-high volume pump in response to pressure rise at said directional control valve means to a predetermined value, and check valve means between said low pressure-high volume pump and said directional control valve means to permit flow of fluid from both of said pumps to said directional control valve for rapid advance and retraction of said movable knife and hold down member and to isolate said pumps from each other for high pressure actuation of said movable knife and said hold down member when they are engaged with the bar; said machine having another fluid motor operatively connected to said back support member with a port of said another fluid motor in fluid communication with said high pressure-low volume pump to provide a back support force proportional to the shearing force exerted by said movable knife.

3. The machine of claim 2 wherein said directional control valve means comprises a four way valve having a neutral position to bypass the output of both pumps to a reservoir and has operating positions to selectively actuate said movable knife and hold down member fluid motors to advance or retract said knife and hold down member with respect to the bar.

4. The machine of claim 3 wherein said system has a relief valve in fluid communication with said high pressure-low volume pump to relieve excess fluid pressure in said movable knife, hold down member, and back support member fluid motors to a reservoir when said four way valve is in one of its operating positions.

5. A hydraulic shearing machine comprising a fixed knife and a movable knife operative to engage opposite sides of longitudinally adjacent sections of a bar or the like to be sheared; a yieldable back support member opposite said movable knife operative to move with the latter during the shearing operation; a hold down member opposite said fixed knife operative to hold the bar in fixed position against said fixed knife during shearing movement of said movable knife; parallel connected fluid motors operative to move said movable knife and said hold down member toward and away from the bar; pump means and directional control valve means operatively connected to said fluid motors to actuate them by substantially equal fluid pressures to apply hold down force proportional to the shearing force as applied by said knife actuating motor; said pump means comprising a dual pump system including a low pressure-high volume pump, and a high pressure-low volume pump operatively connected to supply fluid under pressure to said directional control valve means, an unloading valve means to unload said low pressure-high volume pump in response to pressure rise at said directional control valve means to a predetermined value, and check valve means between said low pressure-high volume pump and said directional control valve means to permit flow of fluid from both of said pumps to said directional control valve for rapid advance and retraction of said movable knife and hold down member and to isolate said pumps from each other for high pressure actuation of said movable knife and said hold down member when they are engaged with the bar; said machine having a back gage member which is adapted to be engaged by the end of the bar to position it for cutting of a piece of predetermined length therefrom; and a fluid motor operatively connected with said back gage member to retract the latter for endwise movement of a cut piece of stock during the shearing operation and for longitudinal feeding movement of the bar and the piece cut therefrom for discharge of the latter from the machine, and to protract said back gage member for engagement with the new end of the bar for cutting of the next piece therefrom, said back gage fluid motor having fluid communication with said low pressure-high volume pump via a directional control valve between said back gage fluid motor and said low pressure-high volume pump.

6. A hydraulic shearing machine comprising a fixed knife and a movable knife operative to engage opposite sides of longitudinally adjacent sections of a bar or the like to be sheared; a yieldable back support member opposite said movable knife operative to move with the latter during the shearing operation; a hold down member opposite said fixed knife operative to hold the bar in fixed position against said fixed knife during shearing movement of said movable knife; parallel connected fluid motors operative to move said movable knife and said hold down member toward and away from the bar; pump means and directional control valve means operatively connected to said fluid motors to actuate them by substantially equal fluid pressures to apply hold down force proportional to the shearing force as applied by said knife actuating motor; said machine having a base plate, and a guide block on said base plate having an opening therethrough for passage of the bar and providing guideways for said movable knife and for said back support member, said fixed knife being secured to said block, said base plate also having thereon a fixed bar support adjacent to said block and said fixed knife, said base plate having thereon vertical guide means for said hold down member for reciprocation of the latter toward and away from a bar supported on said fixed knife and fixed support; said back support member comprising an elongated bar, the end portions of which are engaged in said guideways of said guide block; and a pair of fluid motors suspended beneath said base plate having piston rods extending through said base plate and engaged with said elongated bar, said back support actuating motors being in fluid communication with said pump means upstream of said directional control valve means whereby said back support actuating motors tend to constantly urge said back support member to a stop position substantially flush with said fixed knife thus to support the bar and to be yieldably moved upon engagement of said movable knife with the bar.

7. The machine of claim 6 wherein the ends of said elongated bar are arcuate with a center struck from the middle of the bar to enable tilting of the bar in said guideways without binding; and wherein adjusting means are provided for vertical adjustment of said elongated bar to position said back support member substantially flush with said fixed knife.

8. A hydraulic shearing machine comprising a base structure having upper and lower heads secured to each other by tie rods; an upstanding guide block on said lower head having an opening therethrough for longitudinal feeding of a bar or the like to be sheared; a fixed knife in said block upon which the bar is adapted to be supported for shearing; a bar support means and a back support member on opposite sides of said fixed knife, said guide block having guideways supporting said back support member for vertical movement; a double acting fluid motor on said upper head having a vertically reciprocable knife assembly guided in said guide block for movement of a knife carried thereby into engagement with a bar supported by said fixed knife and said support means and yieldable back support member to shear the bar by displacement of the section of the bar beyond said fixed knife by movement of said movable knife and said back up member with respect to said fixed knife and bar support means; and a bar hold down assembly on said lower head including a vertically reciprocable hold down member above said support means and said fixed knife operative to hold the bar against said fixed knife and said support means during the shearing operation; and fluid motor operated wedge means to exert hold down force on said hold down member in proportion to the shearing force applied on said movable knife by said knife actuating motor; said yieldable back support member being actuated by a fluid motor connected to the same pressure source as is the knife actuating motor and said hold down actuating motor.

9. A hydraulic shearing machine comprising a base structure having upper and lower heads secured to each other by tie rods; an upstanding guide block on said lower head having an opening therethrough for longitudinal feeding of a bar or the like to be sheared; a fixed knife in said block upon which the bar is adapted to be supported for shearing; a bar support means and a back support member on opposite sides of said fixed knife, said guide block having guideways supporting said back support member for vertical movement; a double acting fluid motor on said upper head having a vertically reciprocable knife assembly guided in said guide block for movement of a knife carried thereby into engagement with a bar supported by said fixed knife and said support means and yieldable back support member to shear the bar by displacement of the section of the bar beyond said fixed knife by movement of said movable knife and said back up member with respect to said fixed knife and bar support means; and a bar hold down assembly on said lower head including a vertically reciprocable hold down member above said support means and said fixed knife operative to hold the bar against said fixed knife and said support means during the shearing operation; and fluid motor operated wedge means to exert hold down force on said hold down member in proportion to the shearing force applied on said movable knife by said knife actuating motor; and hold down assembly comprising a pair of upstanding rods on said lower head which straddle said bar support means; and a wedge member vertically movably guided on said rods; said assembly having an upper head vertically adjustable on said rods; and a laterally disposed fluid motor on said head to laterally reciprocate said wedge member between said head and said hold down member; and spring means to raise said hold down member toward said head upon retraction of said wedge member by said fluid motor whereby the sheared bar may be longitudinally advanced for shearing of the next piece therefrom.

10. The machine of claim 9 wherein said hold down assembly has rapid height adjustment means to accommodate large bar size variation.

11. A hydraulic shearing machine comprising a fixed knife and a movable knife operative to engage opposite sides of longitudinally adjacent sections of a bar or the like to be sheared; a yieldable back support member opposite said movable knife operative to move with the latter during the shearing operation; a hold down member opposite said fixed knife operative to hold the bar in fixed position against said fixed knife during shearing movement of said movable knife; parallel connected fluid motors operative to move said movable knife and said hold down member toward and away from the bar; pump means and directional control valve means operatively connected to said fluid motors to actuate them by substantially equal fluid pressures to apply hold down force proportional to the shearing force as applied by said knife actuating motor; said pump means comprising a dual pump system including a low pressure-high volume pump, and a high pressure-low volume pump operatively connected to supply fluid under pressure to said directional control valve means, an unloading valve means to unload said low pressure-high volume pump in response to pressure rise at said directional control valve means to a predetermined value, and check valve means between said low pressure-high volume pump and said directional control valve means to permit flow of fluid from both of said pumps to said directional control valve for rapid advance and retraction of said movable knife and hold down member and to isolate said pumps from each other for high pressure actuation of said movable knife and said hold down member when they are engaged with the bar; said machine having a back gage member which is adapted to be engaged by the end of the bar to position it for cutting of a piece of predetermined length therefrom; and a fluid motor operatively connected with said back gage member to retract the latter for endwise movement of a cut piece of stock during the shearing operation and for longitudinal feeding movement of the bar and the piece cut therefrom for discharge of the latter from the machine, and to protract said back gage member for engagement with the new end of the bar for cutting of the next piece therefrom, said back gage fluid motor having fluid communication with said high pressure-low volume pump via a directional control valve so that said back gage member resists with high force, the elongation of the piece being sheared especially when the latter is shorter than the bar size.

12. A hydraulic shear having a movable shear blade, a hold down clamp and a yieldable backup support, a hydraulic power cylinder for moving said shear blade, a hydraulic hold down clamp cylinder for operating said hold down clamp, a hydraulic backup support cylinder for operating said backup support, all of said cylinders being connected for operation by a common pressure source, whereby the force applied to said shear blade is proportional to the forces applied to said hold down clamp and to said backup support; said common pressure source including a low pressure-high volume pump and a high pressure-low volume pump, and directional control valve means downstream of the connection of said pressure source to said backup support cylinder for communicating the discharge sides of said pumps with said power and hold down clamp cylinders for rapid cycling operation of said shear blade by the conjoint discharge of said pumps during movement of said shear blade toward a bar to be sheared thereby and away from a piece of such bar sheared thereby; said pumps having means associated therewith to conduct the discharge of said high pressure-low volume pump only to all of said cylinders during shearing engagement of said shear blade with such bar.

* * * * *